United States Patent
Terlson

(10) Patent No.: US 7,435,278 B2
(45) Date of Patent: Oct. 14, 2008

(54) DEEP FILTER ELEMENT SUITABLE FOR REPLACING A SHALLOW FILTER ELEMENT AND HAVING A SUPPORT FRAME MADE FROM THIN STOCK

(75) Inventor: Brad A. Terlson, Maple Grove, MN (US)

(73) Assignee: Honeywell International Inc., Morristown, NJ (US)

( * ) Notice: Subject to any disclaimer, the term of this patent is extended or adjusted under 35 U.S.C. 154(b) by 161 days.

(21) Appl. No.: 11/425,940

(22) Filed: Jun. 22, 2006

(65) Prior Publication Data

US 2006/0236667 A1 Oct. 26, 2006

Related U.S. Application Data

(63) Continuation of application No. 11/065,753, filed on Feb. 25, 2005, now Pat. No. 7,090,713, which is a continuation of application No. 10/140,405, filed on May 6, 2002, now Pat. No. 6,875,250.

(51) Int. Cl.
 *B01D 46/00* (2006.01)
(52) U.S. Cl. .............................. 55/495; 55/497; 55/500; 55/501; 55/502; 55/511; 55/DIG. 5; 55/DIG. 31
(58) Field of Classification Search .................. 55/495, 55/497, 500, 501, 502, 511, DIG. 5, DIG. 31; 210/493.5, 495
See application file for complete search history.

(56) References Cited

U.S. PATENT DOCUMENTS

| | | | |
|---|---|---|---|
| 2,008,751 A | 7/1935 | Davies | |
| 3,659,719 A | 5/1972 | Westlin et al. | |
| 3,803,817 A | 4/1974 | Lewis | |
| 4,124,362 A * | 11/1978 | Westlin et al. | .......... 55/DIG. 31 |
| 4,177,050 A | 12/1979 | Culbert et al. | |
| 5,512,074 A | 4/1996 | Hanni et al. | |
| 5,743,927 A * | 4/1998 | Osendorf | ................ 55/DIG. 31 |
| 5,840,094 A | 11/1998 | Osendorf et al. | |
| 6,126,708 A | 10/2000 | Mack et al. | |
| 6,319,300 B1 | 11/2001 | Chen | |
| 6,361,577 B1 * | 3/2002 | Unrath et al. | .................. 55/511 |
| 6,406,509 B1 | 6/2002 | Duffy | |
| 6,454,826 B2 | 9/2002 | Fath et al. | |
| 6,840,975 B2 | 1/2005 | Bohacik | |
| 6,875,250 B2 | 4/2005 | Terlson | |
| 2003/0177745 A1 | 9/2003 | Jauw | |

OTHER PUBLICATIONS

Article not Provided it was Previously Provided in U.S. Appl. No. 11/065,753 "VARICEL Filters" online article from AAF International, 2 pages, Jun. 19, 2003.

Article not Provided it was Previously Provided in U.S. Appl. No. 11/065,753 "High Temperature VARICEL" brochure from AAF International, 2 pages, Aug. 2001.

* cited by examiner

*Primary Examiner*—Jason M Greene

(57) ABSTRACT

A deep format filter element has a peripheral frame with outwardly protruding mounting flanges. The mounting flanges simulate the periphery of a shallow format filter element to allow the deep format filter element to replace the shallow format filter element in many situations.

27 Claims, 2 Drawing Sheets

Fig. 3

DEEP FILTER ELEMENT SUITABLE FOR REPLACING A SHALLOW FILTER ELEMENT AND HAVING A SUPPORT FRAME MADE FROM THIN STOCK

This is a continuation of U.S. patent application Ser. No. 11/065,753, filed Feb. 25, 2005, now U.S. Pat.No. 7,090,713, which is a continuation of U.S. patent application Ser. No.10/140,405 filed May 6,2002, now U.S. Pat. No.6,875,250.

BACKGROUND OF THE INVENTION

It is customary to filter the air provided to occupied spaces by heating, ventilating, and air conditioning (HVAC) equipment. A typical HVAC system for a residence for example, has a fan that while operating draws air present within the occupied space through a return air intake opening and into a plenum or air duct leading to a furnace or air conditioner (generically, air processor) for reprocessing.

HVAC systems frequently cause the reprocessed air to pass through a filter to remove particulate contamination. One convenient and effective way to do this is to filter the air as it enters the return air intake opening in the plenum or duct leading to the air processor. This prevents dirty air from reaching heat exchanger surfaces.

The filter may be a simple mechanical filter with a disposable or renewable element, or may be electronic. The following description pertains to mechanical filters that collect these particles on or within the filter material through which the filtered air passes.

It is helpful at this point to define terms applying to mechanical air filters that will be frequently used in the description to follow. The medium of an air filter is the actual material that performs the filtering function. The air filter element is the entire disposable unit including the medium and any support structure that is installed in a filter housing and is discarded after the medium material has become clogged with air contaminants.

In residential systems, the medium is usually formed in a nominally one inch (2.5 cm.) thick rectangular shape. The filter element usually includes a frame forming the periphery of the filter element as a support structure. The medium is typically either a woven glass fiber mat, or pleated paper or other sheet-type medium material. The breadth and width dimensions of these filter elements vary to conform to the dimensions of the opening in which the element is to be installed, but typically are each on the order of two feet (61 cm.).

In a common design, the frame comprises flexible cardboard edging having a U-shaped cross section enclosing the medium's edges and a small portion of the medium's periphery adjacent the edges. The frame provides stiffness for the filter element and seals the edges against most air leakage around the filter element. This filter format will be referred to hereafter as a shallow filter element or shallow format filter.

The return air intake openings in which these filters are installed typically have annular or inwardly projecting sheet metal or plastic flanges around the entire interior periphery of the opening. The flanges' outer surfaces all lie in a common plane and are set back from the opening a short distance.

The filter's frame is pressed against the flange's outer surface by force from a grille cover having an internal ridge bearing against the filter frame's outer surface to thereby create a tight seal between the outer intake flange surfaces and the inwardly facing filter frame surface. This tight seal forces most all of the air entering the plenum to pass through the filter element medium.

As one would expect, different types of air filters have different efficiencies. "Efficiency" in this context refers to the percentage of the total number of particles in the air stream within a given size range entering the filter that the filter element can catch. The efficiency of filters varies with different particle size ranges. For example, a high efficiency filter medium can catch a significant percentage of particles whose size is on the order of 0.3 micron, where a low efficiency medium catches relatively few of them.

There is also the consideration of overall efficiency as opposed to filter medium efficiency. Overall efficiency takes into account the air leakage around a filter element mounted in its housing. Leaking air is of course completely unfiltered. Its particle load pollutes the stream of filtered air, resulting in an overall efficiency lower than the medium efficiency.

But efficiency is not the only measure of medium quality. It is also important that a filter not create a large pressure drop in the air passing through it. A large pressure drop requires a more powerful fan to force the required air volume through it. And if the pressure drop is too great, the medium will deflect and perhaps even burst or tear as the load of trapped debris obstructs the air passages through the medium.

The amount of pressure drop presented by a particular medium depends largely on the number of voids or openings per unit area of the medium, on the average minimum cross section area of the pores, and of course on the total area of the medium through which the air flows. To a lesser extent, pressure drop is also dependent on the medium thickness, in the same manner that a long duct creates more resistance to air flow through than does a short duct, other things being equal.

Obviously, as a filter element loads up with debris during use, its pressure drop increases. This leads into a further consideration for filters, that of carrying capacity and filter element life. "Carrying capacity" refers to the number of particles the filter element can catch or hold per unit area projected to the air stream before clogging up to a point where the ability to remove particles is impaired and/or the pressure drop across the filter element becomes unacceptable. ("Dust-holding" capacity is an industry term that we intend to be substantially equivalent to carrying capacity.) Other things being equal, carrying capacity is directly related to total medium area. The capacity of mat filters which trap some of the particles within their volume may also depend to some extent on their thickness. Carrying capacity is one factor in determining the life of the element and thus the cost of filtering the air.

Filter technology advances have led to improvements in each of these characteristics. Nevertheless, it is still true that there are tradeoffs between efficiency, pressure drop, and carrying capacity. For example, as a filter medium becomes more efficient, its pressure drop typically increases because the individual passages through the medium become smaller, other things being equal. Of course, it may be possible to add more passages per unit area, but this is not a trivial problem.

Increasing the filter efficiency will often reduce the carrying capacity of the titter element. Often, higher efficiency produces a higher initial pressure drop. Thus as the filter element loads up with particles, the pressure drop reaches an unacceptable level more quickly.

An easy way to minimize pressure drop and maximize capacity is to increase total medium area. This fact has led to the development of the pleated filters mentioned. These pleated filters are made from a long strip of sheet filter medium which is folded back and forth on itself accordion-fashion to form a series of pleats. So long as the adjacent pleat panels do not touch each other the air can easily flow through the individual pleats.

In order to maintain spacing of adjacent pleats from each other under the force created by the normal pressure drop across the medium, it is possible to insert combs on the downstream side of the medium that have individual teeth between each pair of adjacent pleat panels. The teeth prevent adjacent pleats from collapsing against each other.

Improved filter media have been developed whose pressure drop and carrying capacity is superior to that of shallow format mat and pleated filters. These media typically have relatively deep pleats (4-5 in. or 10-12.5 cm.) to provide a relatively large medium area providing lower pressure drop and better carrying capacity. These deep pleat elements are intended for use in return air ducts having intake openings capable of receiving such filter elements.

In one design the filter elements collapse into a relatively small volume for shipping. They have relatively rigid cardboard or plastic end strips or panels that detachably mate with reusable side panels to form a reasonably rigid rectangular filter element. See U.S. Pat. No. 5,840,094 issued on Nov. 24, 1998 to Osendorf, et al. ('094) for an example of such a collapsible filter medium which can be assembled into a deep format pleated filter element using a pair of special side panels. The filter element assembly is mounted in the return air intake, placing the filter element directly in the return air stream.

Collapsible filter media have the distinct advantage of compactness during shipping. But the time and effort required for assembling collapsible filter media for use is one disadvantage of them. The many pleats each require a tooth of the comb, whose insertion between each pair of pleats is time-consuming. And overall filtering efficiency suffers because of difficulty in providing a total air seal between the intake flanges of the return air duct and the cardboard sides of the filter element.

BRIEF DESCRIPTION OF THE INVENTION

We have developed a deep format filter element structure that requires no assembly and has a frame for supporting the filter element made of cardboard or other thin, flexible sheet-type material. This deep format filter element can replace a shallow format filter element in the same way that the filter element of the '094 patent can do so.

The term "cardboard" hereafter includes not only for example the thin stock called "beverage board" in the industry and used for soda can boxes, but also includes corrugated cardboard, thin plastic, or even thin metal stock. The preferred beverage board material thickness for the filter element frame is on the order of 0.024 in. (0.60 mm.). The distinct characteristics of the "cardboard" material comprising the filter element's frame are that the material can be easily bent into 90° angles along the proper lines and can be securely assembled using easily-applied bonding agents. Scoring of the bend lines on the outside of the bend often makes accurate bending of cardboard easier.

The invention is a deep filter element having a filter medium with a plurality of edge planes defining a medium periphery and first and second opposite facing face planes through which air to be filtered can pass. A frame encloses the medium periphery. The frame has a plurality of body sections. Each body section has a wall in generally facing relationship to one of the medium edge planes.

At least first and second body sections each have a mounting flange projecting from the body section wall and away from the medium edge plane. Each mounting flange has a rectangular cross section defined by first and second side panels and an end panel. Each mounting flange simulates a part of the periphery of a shallow filter element.

The frame comprises at least a first cardboard sheet forming individual sides of the frame and sections of the flange. The terms "inside fold" and "outside fold" in the description of the invention refer to the relationship of the fold to adjacent surfaces of the cardboard sheet. An outside fold is a fold in the cardboard sheet that forms an included angle facing generally away from the filter element. An inside fold is a fold in the cardboard sheet that is not an outside fold.

For each mounting flange the first cardboard sheet includes at least two inside folds defining edges of the mounting flange's end panel and first and second side panels, and least one outside fold defining an edge of the second side panel of the mounting flange. In one preferred embodiment each of the frame sides has a flange projecting therefrom.

In this embodiment, the first side panels of each of the mounting flanges are generally coplanar and the second side panels of the mounting flanges are generally coplanar. The term "generally" is used here and throughout the description to mean "functionally" and "approximately". Since the structural material here is relatively thin and flexible, normal loading and stress will often deflect the material to shapes that do not have the exact structural relationship stated.

In a further embodiment, each body section has a first fastening tab defined by the outside fold and end edge. The end edge forms an edge of the first fastening tab. The first fastening tab is bonded with glue or other type of fastening means to another surface of the body section.

For efficient assembly and improved rigidity of the assembled frame, it is advantageous to form each body section from a second cardboard sheet in addition to the first cardboard sheet. The first and second cardboard sheets are scored and folded to form different panels of the body section. The second cardboard sheet is glued to the first cardboard sheet to stabilize them into the desired shape of the body section.

A number of design variants exist that make the various panels as parts of one or the other of the first and second cardboard sheets.

DESCRIPTION OF THE PREFERRED EMBODIMENTS

Figures 1, 2:
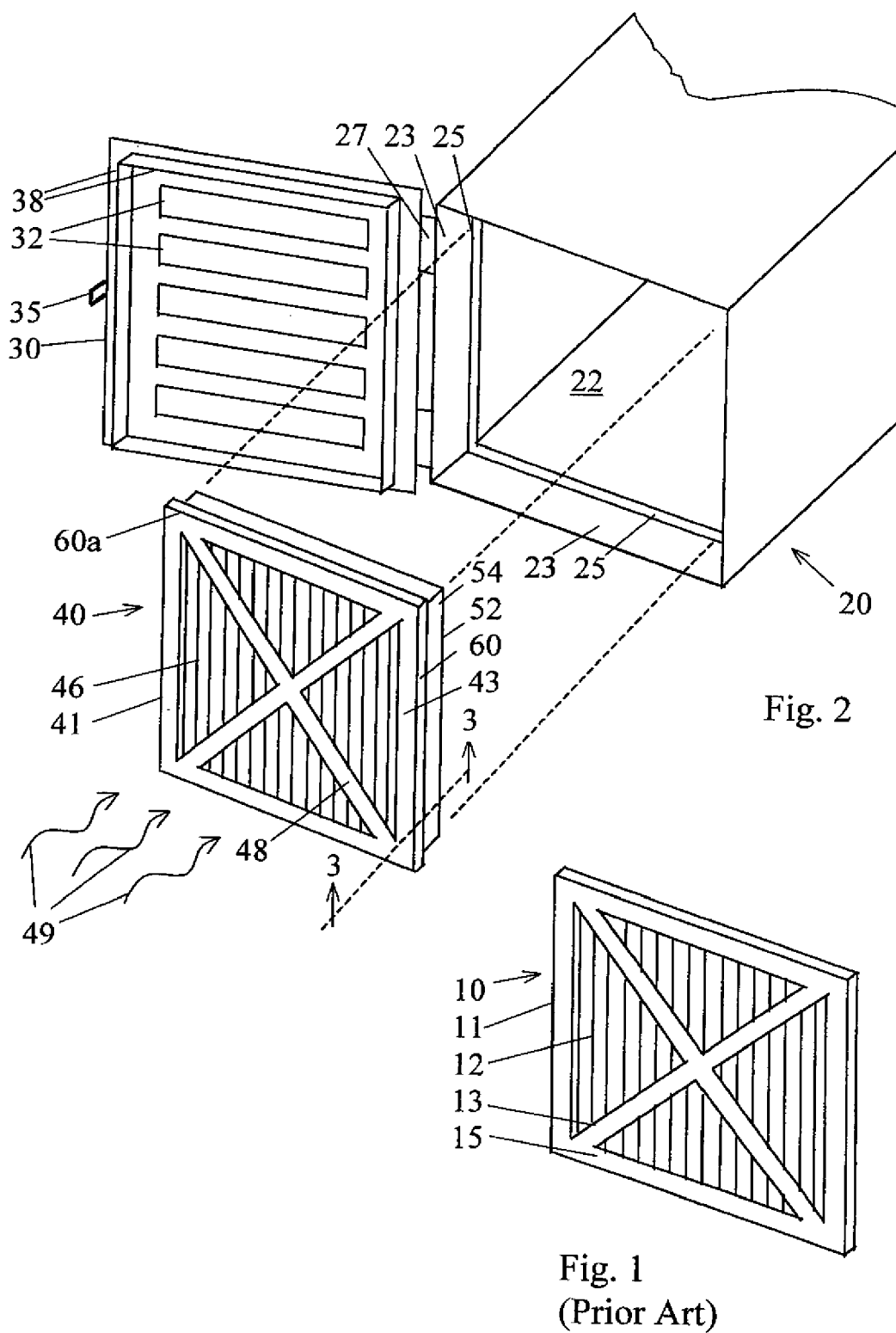
FIG. 1 is a perspective view of a prior art shallow filter element.
FIG. 2 is an exploded perspective of an installation employing the filter element of the invention.

The prior art shallow format filter 10 shown in FIG. 1 has a frame 11 surrounding a filter element 12. Frame 11 is usually made from some type of relatively light, thin material such as beverage board. Frame 11 includes a flange 15 extending the length of each side of the filter element 12. Braces 13 lend rigidity to frame 11. In many cases, format of braces 13 will be substantially more complex than that shown to provide mechanical support for the relatively flexible material comprising frame 11.

Filter element 10 is designed to fit into a return air intake opening 22 of duct 20 as shown in FIG. 2. Opening 22 may be constructed to have any combination of many different heights and widths These heights and widths are somewhat standardized however, so that perhaps 10 to 20 different sizes of filter elements 10 suffice to match most openings 22.

Four duct walls 23 define opening 22. Interior sealing flanges 25 project perpendicularly from each of the four duct walls 23. Sealing flanges 25 are arranged in a coplanar fashion with each other. When filter element 10 is mounted for use in the opening 22 defined by the four duct walls 23 and the sealing flanges 25, flanges 25 come into close contact with filter element frame 11.

A door 30 is mounted on hinges 27 to swing between the open position shown and a closed position where door 30 covers opening 22 with an interior surface facing into the duct 20. Door 30 has an internal door flange 38 near the periphery of door 30 and projecting perpendicularly from the interior door 30 surface. Openings 32 allow air to flow unimpeded through door 30. A latch 35 holds door 30 in the closed position while allowing door 30 to be easily opened.

A filter element 11 suitable for duct 20 and mounted in opening 22 is held in slight compression between flanges 25 and 38. This compression, along with the drag force arising from the air drawn through filter element 10 provides adequate mating between flanges 25 and 38 to resist air leakage between flanges 25 and frame 11.

The invention is embodied in features of an improved deep format filter element 40. Filter element 40 includes a pleated medium 46 and a filter frame 41. While medium 46 need not be pleated, the advantage that a deep medium 46 has is most significantly available in today's technology from a pleated structure. Medium 46 has a generally orthogonal peripheral or surface shape defined by four rectangular edge planes 47 (one of which is shown on edge in FIG. 3), and first and second rectangular face planes. Combs (not shown) may be placed on the downstream side of medium 46 to keep individual pleats from touching each other. Air to be filtered by medium 46 passes through the face planes as indicated by the wavy arrows 49.

Frame 41 comprises the four body sections 52, etc. and braces 48 and 49, all of which may comprise sheet cardboard such as beverage board. At least two non-adjoining body sections 52, etc. (and preferably all four) each include a mounting flange 60, 60a, etc. integral with the adjacent body section. Braces 48 are typically integral with a side panel of mounting flanges 60, 60a, etc. Braces 48 help to hold medium 46 within frame 41 and to lend rigidity to frame 41. Braces 48 can have many different configurations to prevent flexing or bending of the individual frame sections 52, etc. and the mounting flanges 60, 60a, etc. The configuration for braces 48 shown in FIG. 2 is simply exemplary, and less complex than that of a present commercial version.

Figure 3:
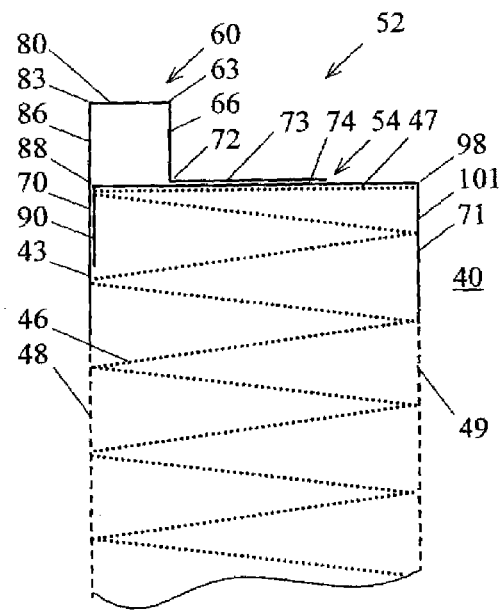
FIGS. 3-6 are cross-sections of the peripheries of filter elements having different versions of the structure of the invention.
Figure 4:
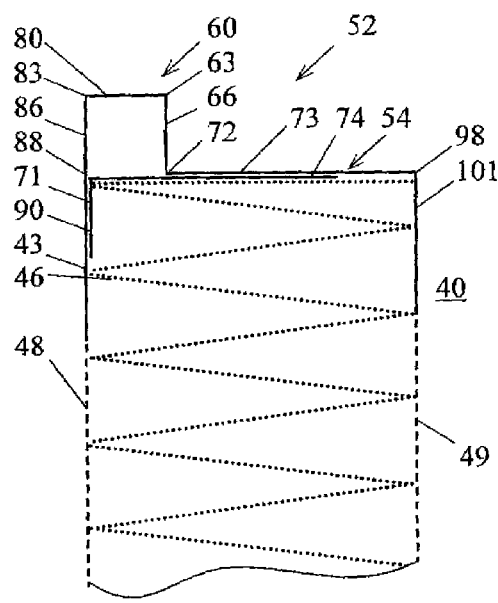

Similar braces 49 on the side of filter element 40 facing away from the viewer are only shown on edge in FIGS. 3 and 4. Braces 49 are integral with a frame flange 101 (see FIGS. 3-6). Braces 48 and 49 in addition to providing necessary rigidity for filter element 40 should also be configured to provide little resistance to air flowing through medium 46 and to allow maximum exposure of medium 46 to the air stream.

Body sections 52, etc. enclose the edge planes 47 of medium 46. Each body section 52, etc. includes walls 54, etc. facing the medium 46 edge planes 47. The mounting flange 60, 60a, etc. extends away from the adjacent edge plane 47 and projects above the adjacent wall 54, etc. Mounting flanges 60a, 60b, etc. are intended to simulate the frame 11 of the shallow format filter element 10 shown in FIG. 1.

Each body section 52, etc. includes a frame flange 43 unitary with one side of mounting flange 60 and extending to overlap the adjacent face plane of medium 46. Extending flange panel 43 to overlap medium 46 is a convenient way to enhance the overall stiffness of filter element 40. A similar frame flange 101 is shown only on edge in FIGS. 3-6.

Walls 54, etc. define a structure that will fit inside the intake flanges 25 and project into opening 22 of duct 20. Similarly, flanges 60, 60a, etc. must fit within duct walls 23 and form facing contact with flanges 25. Duct 20 must be configured to permit filter element 40 to project past flanges 25 and into duct 20 without interference.

As suggested by the dotted alignment lines, filter element 40 fits into the intake of duct 20. Walls 54 slip within the opening defined by the interior edges of flanges 25. The outside-facing surfaces of flanges 25 seal against the facing surfaces of flanges 60, 60a, etc. when filter element 40 is installed properly. Door 30 can be swung on hinges 27 to cover and retain filter element 40 in the intake of duct 20. An air stream symbolized by wavy arrows 49 flows through openings 32 and the medium 46, removing any contaminants that medium 46 is capable of removing.

Figure 5:
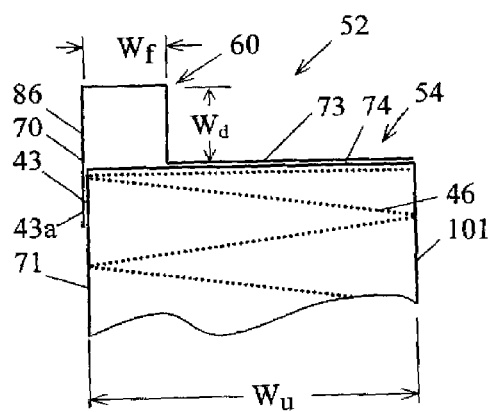
Figure 6:
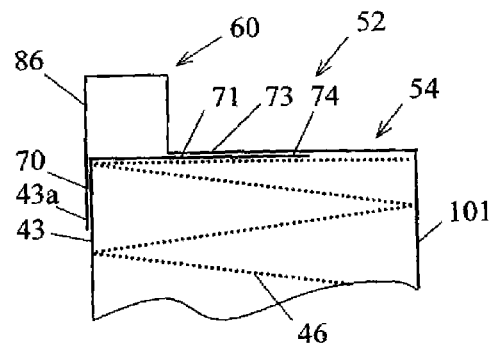

The construction of frame 41 is shown in greater detail in the section view 3-3 of FIG. 3 taken from FIG. 2. FIGS. 4-6 are similar views of FIG. 2 that show variant structures for frame 41. FIG. 3 shows most of the important characteristics of the invention. FIGS. 4-6 show the variety of construction details that are possible in implementing the features of the invention.

Frame 41 can be constructed from beverage board or other light cardboard with thickness in the range of 0.020 to 0.030 in. (0.050 to 0.075 cm.). The thickness should be chosen to allow filter element 50 to maintain its shape during handling and to assist medium 46 as needed to resist air pressure forces while in use. Size of filter element 40 as well as characteristics of the available materials affects the thickness of the cardboard to be used. Note the earlier definition of sheet "cardboard". As used herein. "cardboard" is defined relatively broadly to deal with the likely changes in technology or consumer preferences in the years to come.

The details of construction for four different variants of frames 41 are shown in FIGS. 3-6. Each of these variants has first and second cardboard sheets 70 and 71 forming at least a first body section 52 of frame 41. First and second sheets 70 and 71 may be partially unitary or integral with one or more similar sheets forming parts of other body sections 52, etc.

Individual planar sections of a cardboard sheet 70 or 71 between two folds or between a fold and an edge will be generally referred to as panels. Panels run longitudinally along a body section 52, etc. and are defined along the long dimensions by two folds or one fold and an edge of the cardboard sheet 70 or 71. For consistency, the same reference numbers have been given to an outer panel 73 and an inner panel 74 that cooperate to form a wall 54 in each of FIGS. 3-6 regardless of which cardboard sheet 70 or 71 they are a part. Panels 73 and 74 are bonded together to form wall 54, which is functionally identical in each of FIGS. 3-6.

Cardboard sheets 70 and 71 are first cut from sheet cardboard to the required shape and scored to assist folding. The sheets are then folded to form the individual panels of the cross section shape shown in FIGS. 3-6.

The external dimensions for each variation of body section 52, etc. in FIGS. 3-6 are similar. The structure here does not demand great dimensional precision. The dimensions are shown on FIG. 5 only because more room is available than on FIG. 3 for example. In each of FIGS. 3-6, $W_f$ and $W_d$ will typically be in the range of 1 in. (2.5 cm.) but of course can have a variety of convenient dimensions. $W_u$ will typically range between 3 and 5 in. (7.5 to 12.5 cm.).

In FIGS. 3-6, the reader will note a small gap or space between adjacent cardboard panels as for example between cardboard panels 73 and 74 in each of FIGS. 3-6. This gap represents glue or other attachment means for fastening the adjacent cardboard panels to each other. In fact, these gaps can even represent staples for fastening adjacent sections to each other if this is found to be more efficient.

A typical assembly process includes cutting each sheet into the desired shape and then scoring according to established principles to assist bending. Then individual surfaces of the panels are coated with a layer of appropriate glue as needed to form the bond for fastening to the adjacent panel. So for example, panel 73 may be coated with glue to fasten panel 73 to panel 74.

The glue should have suitable strength and harden quickly enough to avoid delay in further assembly and packaging of individual filter elements 40. On the other hand the hardening time of the glue should be adequate to allow complete assembly before adhesion deteriorates. The glue can also be a contact type possibly requiring a coating on both surfaces to be bonded to each other. Glue can also be used to stabilize the individual pleats of medium 46 within frame 41. All this is well known in the technology of cardboard products, and more particularly, in carton design and assembly.

FIGS. 3-6 show frame section 52 cross-sections that have structural variants, but that are functionally identical. Considering the specific variant shown in FIG. 3 as representative, each frame section 52 includes the mounting flange 60, frame flanges 43 and 101, and wall 54. The term "fold" will be used as the equivalent of "fold line" hereafter.

The first cardboard sheet 70 is scored on the appropriate side along each fold line, typically opposite the fold, and then folded at the fold lines. Fold 83 forms a first side of both side panel 86 and end panel 80 of mounting flange 60. Side panel 86 and frame flange 43 are coplanar and together form a single larger panel. Fold 83 is an inside fold since the inside included cross section angle formed by panels 86 and 80 generally faces toward the side plane of medium 46.

Fold 63 forms one side of both side panel 66 and a second side of end panel 80, and is also an inside fold. Fold 72 is an outside fold that defines the second side panel 66 and outer panel 73. Panel 73 forms a fastening tab in FIG. 3 (and in FIG. 5 as well) that is bonded to panel 74 in the position shown to collectively form wall 54. Panel 73 may extend to fold 98.

The second cardboard sheet 71 is scored on the appropriate side along each fold line, and then is folded to form folds 88 and 98. Fold 88 forms one side of each of panels 74 and 90. Panel 90 is a fastening tab that is bonded to the inner surface of flange panel 43.

Fold 98 defines the second side of inner panel 74, and the one side of the panel forming frame flange 101. Inner panel 74 was mentioned earlier as bonded to panel 73 to collectively form wall 54. Frame flange 101 overlaps a face plane of medium 46 to add stiffness to filter element 40.

Braces 48 and 49 are integral with frame flanges 43 and 101 respectively. Typically, braces 48 and each of the first cardboard sheets 70 are cut from the same larger sheet of cardboard. The corners are formed with tabs that extend from at least one of the panels that form mounting flanges 60, walls 54, and frame flanges 43 and 101. Several of these panels are folded 90° as needed and are bonded to the similar panel of the adjacent cardboard sheet 70 and 71.

Forming these panels and then fastening them as described to the various other panels allows a filter element 40 to be formed from an appropriately sized medium 46 and an appropriately cut sheet of cardboard stock. The cardboard material forms all of the elements of frame 41.

At least some of the portions of medium 46 that contact surfaces of cardboard sheets 70 and 71 can be bonded to the adjacent surfaces of those cardboard sheets. Such additional bonding lends more rigidity to filter element 40. This construction has more than adequate rigidity and mechanical strength for a discardable filter element 40.

FIG. 4 shows a frame section 52 where all of the various panels are a part of cardboard sheet 70 except for two panels 74 and 90 formed by second cardboard sheet 71. Panels 74 and 90 are defined by fold 98 and form fastening tabs that are bonded or otherwise attached to the adjacent surfaces of panels 73 and 43 to provide the structural integrity for the frame 40.

FIG. 5 shows another construction variant for a body section 52. Panels of cardboard sheet 71 form both frame flanges 43 and 101. A panel 43a that is part of panel 86 and sheet 70 is bonded to and is a part of frame flange 43. FIG. 5 is the actual commercial embodiment presently in use. Extending panel 73 to frame flange 101 may provide desirable added stiffness for wall 54.

FIG. 6 shows a final variant for frame section 52. Cardboard sheet 71 forms frame flange 43 only. A panel 43a that is part of panel 86 and sheet 70 is bonded to and is a part of frame flange 43.

The invention taught by the above description has a frame 41 formed only of cardboard, and yet has adequate rigidity and mechanical strength to support a deep filter medium 46 when mounted in a typical intake 22 designed for a shallow filter medium such as medium 10. The variant to be chosen depends on considerations that are beyond the scope of this description. Other variants that provide similar functionality are possible as well. All of these variants are within the scope of the invention.

I claim:

1. A filter assembly, comprising:
   a filter medium having first and second opposite faces, through which air to be filtered can pass, the first and second opposite faces being separated by a distance; and
   a frame including two or more opposing side faces to provide support to the filter medium, each of the two or more opposing side faces having a length perpendicular to the distance between the first and second opposite faces, the frame including a first sheet that includes a first portion that extends along a majority of the length of one of the two or more opposing side faces and a second portion that extends along at least part of the first opposite face and a second sheet that includes a first portion that also extends along a majority of the length of the one of the two or more opposing side faces and a second portion that extends along at least part of the first opposite face, wherein at least part of the second portion of the first sheet that extends along at least part of the first opposite face is secured to at least part of the second portion of the second sheet that extends along at least part of the first opposite face.

2. The filter assembly of claim 1 wherein the first sheet also extends along at least one of the side faces for at least a majority of the distance between the first and second opposite faces.

3. The filter assembly of claim 2 wherein the second sheet also extends along at least one of the side faces for at least a majority of the distance between the first and second opposite faces, and is secured to the first sheet along at least one of the side faces.

4. The filter assembly of claim 3 wherein the second sheet also includes a portion that extends down along at least part of the second opposite face.

5. The filter assembly of claim 4 wherein the first sheet does not include a portion that extends down along at least part of the second opposite face.

6. The filter assembly of claim 1 further including a flange that extends in a direction laterally away from the filter medium and around at least a portion of the perimeter of the first opposing face, wherein the flange includes a portion that extends down along at least part of the first opposite face.

7. A filter assembly, comprising:
a filter medium having first and second opposite faces, through which air to be filtered can pass, the first and second opposite faces being separated by a distance; and
a frame including two or more opposing side faces to provide support to the filter medium, each of the two or more opposing side faces having a length perpendicular to the distance between the first and second opposite faces, the frame including a first sheet that extends along at least a majority of the length of a first side face of the two or more opposing side faces for at least a majority of the distance between the first and second opposite faces, and a second sheet that extends along at least a majority of the length the first side face for at least a majority of the distance between the first and second opposite faces, wherein the second sheet overlaps and is secured to the first sheet along at least a portion of the first side face.

8. The filter assembly of claim 7 wherein the first sheet includes a portion that extends down along at least part of the first opposite face.

9. The filter assembly of claim 8 wherein the second sheet includes a portion that also extends down along at least part of the first opposite face.

10. The filter assembly of claim 9 wherein at least part of the portion of the first sheet that extends down along at least part of the first opposite face is secured to at least part of the portion of the second sheet that extends down along at least part of the first opposite face.

11. The filter assembly of claim 9 wherein the second sheet includes a portion that extends down along at least part of the second opposite face.

12. The filter assembly of claim 11 wherein the first sheet does not include a portion that extends down along at least part of the second opposite face.

13. The filter assembly of claim 7 wherein the first sheet is situated between the second sheet and the filter medium along at least part of at least one of the side faces.

14. The filter assembly of claim 7 further including a flange that extends in a direction laterally away from the filter medium and around at least a portion of the perimeter of the first opposite face, wherein the flange includes a portion that extends down along at least part of the first opposite face.

15. The filter assembly of claim 14 wherein the second sheet forms at least part of the flange.

16. A filter assembly, comprising:
a filter medium having first and second opposite faces, through which air to be filtered can pass, the first and second opposite faces being separated by a distance;
a first cardboard sheet that extends along at least a first side face of the filter medium for at least a majority of the distance between the first and second opposite faces;
a second cardboard sheet that extends along at least the first side face of the filter medium for at least a majority of the distance between the first and second opposite faces, the first cardboard sheet overlapping the second cardboard sheet for a majority of the length of the first side face, and the first cardboard sheet secured to the second cardboard sheet along at least part of said one or more side faces; and a flange that extends in a direction laterally away from the filter medium and around at least a portion of the perimeter of the first opposing face, the flange having at least two inside folds that define at least part of a cavity.

17. The filter assembly of claim 16 wherein at least one of the first cardboard sheet and second cardboard sheet extends the full or substantially the full distance from the first opposite face to the second opposite face of the filter medium.

18. The filter assembly of claim 16, wherein the first cardboard sheet and the second cardboard sheet overlap one another over a majority of the distance between the first and second opposite faces to provide support to the filter medium.

19. The filter assembly of claim 16 wherein the first cardboard sheet extends down and along at least part of the first opposite face.

20. The filter assembly of claim 19 wherein the second cardboard sheet extends down and along at least part of the first opposite face.

21. The filter assembly of claim 19 wherein the second cardboard sheet extends down and along at least part of the second opposite face.

22. The filter assembly of claim 16 wherein the flange includes a portion that extends down along at least part of the first opposite face.

23. The filter assembly of claim 22 wherein the second cardboard sheet forms at least part of the flange.

24. A filter assembly, comprising:
a filter medium having first and second opposite faces, through which air to be filtered can pass, and a number of side faces that extend between the first and second opposite faces, the first and second opposite faces being separated by a distance;
a frame extending along one or more of the side faces to provide support to the filter medium, the frame including a first sheet that includes a portion that extends down along at least part of the first opposing face and a second sheet that includes a portion that also extends down along at least part of the first opposing face, wherein at least part of the portion of the first sheet that extends down along at least part of the first opposing face is secured to at least part of the portion of the second sheet that extends down along at least part of the first opposing face;
wherein the first sheet also extends along at least one of the side faces for at least a majority of the distance between the first and second opposite faces;
wherein the second sheet also extends along at least one of the side faces for at least a majority of the distance between the first and second opposite faces, and is secured to the first sheet along at least one of the side faces;
wherein the second sheet also includes a portion that extends down along at least part of the second opposing face; and
wherein the first sheet does not include a portion that extends down along at least part of the second opposing face.

25. The filter assembly of claim 24 wherein the first sheet is situated between the second sheet and the filter medium along at least part of at least one of the side faces.

26. A filter assembly, comprising:
a filter medium having first and second opposite faces, through which air to be filtered can pass, and a number of side faces that extend between the first and second opposite faces, the first and second opposite faces being separated by a distance;
a frame extending along one or more of the side faces to provide support to the filter medium, the frame including a first sheet that includes a portion that extends down along at least part of the first opposing face and a second sheet that includes a portion that also extends down along at least part of the first opposing face, wherein at least part of the portion of the first sheet that extends down along at least part of the first opposing face is secured to at least part of the portion of the second sheet that extends down along at least part of the first opposing face; and a flange that extends in a direction laterally away from the filter medium and around at least a portion of the perimeter of the first opposing face, wherein the flange includes a portion that extends down along at least part of the first opposite face.

27. The filter assembly of claim 26 wherein the second sheet forms at least part of the flange.

* * * * *